US008164833B2

(12) United States Patent
Yuba et al.

(10) Patent No.: US 8,164,833 B2
(45) Date of Patent: Apr. 24, 2012

(54) OPTICAL WINDOW MEMBER

(75) Inventors: Takashi Yuba, Shinagawa (JP); Takashi Arita, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 392 days.

(21) Appl. No.: 11/822,302

(22) Filed: Jul. 3, 2007

(65) Prior Publication Data

US 2008/0198469 A1 Aug. 21, 2008

(30) Foreign Application Priority Data

Feb. 20, 2007 (JP) ................................ 2007-039479

(51) Int. Cl.
*B02B 13/20* (2006.01)

(52) U.S. Cl. ......................... 359/599; 359/586; 359/742

(58) Field of Classification Search .................. 359/599, 359/601–614, 831, 577–590, 742
See application file for complete search history.

(56) References Cited

U.S. PATENT DOCUMENTS

| | | | | |
|---|---|---|---|---|
| 5,422,756 | A * | 6/1995 | Weber | 359/487 |
| 5,782,995 | A * | 7/1998 | Nanya et al. | 136/257 |
| 5,909,314 | A * | 6/1999 | Oka et al. | 359/582 |
| 6,297,908 | B1 * | 10/2001 | Suga | 359/599 |
| 6,665,029 | B2 * | 12/2003 | Kondo et al. | 349/113 |
| 6,700,716 | B2 * | 3/2004 | Sejkora | 359/834 |
| 6,710,923 | B2 * | 3/2004 | Ito | 359/599 |
| 6,951,400 | B2 * | 10/2005 | Chisholm et al. | 362/29 |
| 7,268,948 | B2 * | 9/2007 | Matsuo et al. | 359/575 |
| 2004/0223220 | A1 * | 11/2004 | Kawanishi et al. | 359/485 |
| 2004/0240070 | A1 * | 12/2004 | Suzuki et al. | 359/599 |
| 2006/0050387 | A1 * | 3/2006 | Arakawa et al. | 359/491 |
| 2007/0047111 | A1 * | 3/2007 | Lee et al. | 359/831 |
| 2008/0112055 | A1 * | 5/2008 | Aro et al. | 359/599 |

FOREIGN PATENT DOCUMENTS

| | | | | |
|---|---|---|---|---|
| JP | 9-307132 | | 11/1997 | |
| JP | 11-142622 | * | 5/1999 | 359/599 |
| JP | 2003-66162 | | 3/2003 | |
| JP | 2005-69842 | | 3/2005 | |
| WO | 95/12897 | | 5/1995 | |

OTHER PUBLICATIONS

Patent Abstract of Espacenet, Publication No. 2003-66162, Publication Date Mar. 5, 2003.
Patent Abstract of Espacenet, Publication No. 2005-69842, Publication Date Mar. 17, 2005.
Patent Abstract of Espacenet, Publication No. 9-307132, Publication Date Nov. 28, 1997.

* cited by examiner

*Primary Examiner* — Thong Nguyen
(74) *Attorney, Agent, or Firm* — Staas & Halsey LLP

(57) ABSTRACT

An optical window member includes a transparent synthetic resin plate having a surface with a protruding/recessed pattern of a predetermined fineness that causes light diffusion, and an optical thin film formed on the surface of the transparent synthetic resin plate with the protruding/recessed pattern. The optical thin film determines a component of light transmitted through the optical thin film and light reflected from the optical thin film.

4 Claims, 22 Drawing Sheets

| VISUAL COLOR | | YELLOW |
|---|---|---|
| OPTICAL THIN FILM (30) | $TiO_2$ (31) | 74nm |
| | $SiO_2$ (32) | 74nm |
| | $TiO_2$ (31) | 74nm |
| | $SiO_2$ (32) | 74nm |
| | $TiO_2$ (31) | 74nm |
| | $SiO_2$ (32) | 74nm |
| | $TiO_2$ (31) | 74nm |
| | $SiO_2$ (32) | 74nm |
| | $TiO_2$ (31) | 74nm |
| | TOTAL FILM THICKNESS | 666nm |
| POLYCARBONATE (21) | | 0.5mm |
| Si(film) ; BASE (51) | | |

FIG.10

| VISUAL COLOR | | VIOLET |
|---|---|---|
| OPTICAL THIN FILM (30A) | $TiO_2$ (31A) | 104nm |
| | $SiO_2$ (32A) | 104nm |
| | $TiO_2$ (31A) | 104nm |
| | $SiO_2$ (32A) | 104nm |
| | $TiO_2$ (31A) | 104nm |
| | $SiO_2$ (32A) | 104nm |
| | $TiO_2$ (31A) | 104nm |
| | $SiO_2$ (32A) | 104nm |
| | $TiO_2$ (31A) | 104nm |
| | TOTAL FILM THICKNESS | 936nm |
| POLYCARBONATE (21) | | 0.5mm |
| Si(film) ; BASE (51) | | |

FIG.13

| VISUAL COLOR | | ROSE PINK |
|---|---|---|
| OPTICAL THIN FILM (30B) | $TiO_2$ (31B) | 88nm |
| | $SiO_2$ (32B) | 88nm |
| | $TiO_2$ (31B) | 88nm |
| | $SiO_2$ (32B) | 88nm |
| | $TiO_2$ (31B) | 88nm |
| | $SiO_2$ (32B) | 88nm |
| | $TiO_2$ (31B) | 88nm |
| | $SiO_2$ (32B) | 88nm |
| | $TiO_2$ (31B) | 88nm |
| | TOTAL FILM THICKNESS | 792nm |
| POLYCARBONATE (21) | | 0.5mm |
| Si(film) ; BASE (51) | | |

20D

20D

20E

20E

OPTICAL WINDOW MEMBER

BACKGROUND OF THE INVENTION

1. Field of the Invention

The present invention relates to optical window members, and more particularly to an optical window member arranged on the front side of a solar battery.

2. Description of the Related Art

There are products with a built-in solar battery used as a power source. For example, there are watches with a solar battery arranged behind the dial plate. In such a watch, an optical window member is provided on the front side of the solar battery so that the solar battery is not visible and to enhance decorative effects. It is important that the power generation efficiency of the solar battery not be decreased by the optical window member any more than necessary.

As shown in FIG. 1, a conventional optical window member includes a glass substrate 1 on which a shielding layer 2 that diffuses light reflected from a solar battery 10 so as to reduce the amount of light irradiated upward, an interference filter 3, and a diffusing layer 4 that diffuses light reflected from the solar battery 10 are arranged. The solar battery 10 is formed underneath the glass substrate 1 by forming an amorphous silicon film by a PCVD (plasma-activated chemical vapor deposition) method.

The solar battery is not visible when the optical window member is viewed from the top, and power is efficiently generated from the solar battery.

Patent Document 1: International Application Publication No. WO95/12897

However, the above described optical window member includes three layers on the glass substrate 1, namely the shielding layer 2, the interference filter 3, and the diffusing layer 4. Accordingly, it is difficult to reduce manufacturing costs.

SUMMARY OF THE INVENTION

The present invention provides an optical window member in which one or more of the above-described disadvantages are eliminated.

An embodiment of the present invention provides an optical window member including a transparent synthetic resin plate comprising a surface with a protruding/recessed pattern of a predetermined fineness that causes light diffusion; and an optical thin film formed on the surface of the transparent synthetic resin plate with the protruding/recessed pattern, wherein the optical thin film determines a component of light transmitted through the optical thin film and light reflected from the optical thin film.

According to at least one embodiment of the present invention, an optical window member has a two-layered structure including a plate member and an optical thin film, and can thus be manufactured at lower cost than a conventional optical window member having a three-layered structure.

BRIEF DESCRIPTION OF THE DRAWINGS

Other objects, features and advantages of the present invention will become more apparent from the following detailed description when read in conjunction with the accompanying drawings, in which:

FIG. 10 is an analytical model of a structure with a solar battery covered by the optical window member shown in FIGS. 9A, 9B;

FIG. 13 is an analytical model of a structure with a solar battery covered by the optical window member shown in FIGS. 12A, 12B;

DETAILED DESCRIPTION OF THE PREFERRED EMBODIMENTS

A description is given, with reference to the accompanying drawings, of an embodiment of the present invention.

First Embodiment

Figure 1:
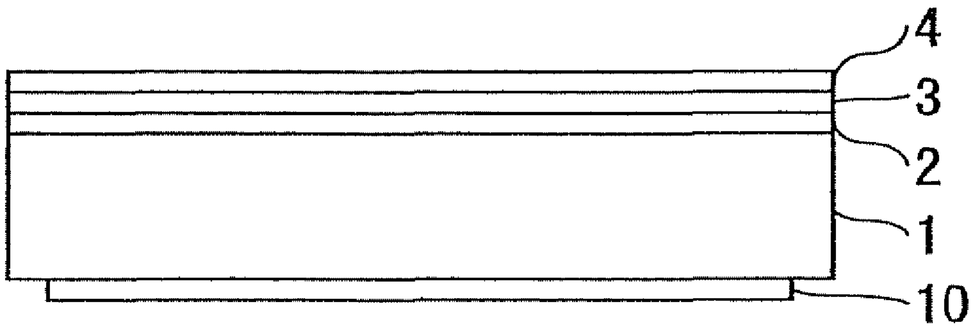
FIG. 1 is a schematic diagram of a conventional optical window member.
Figure 2:
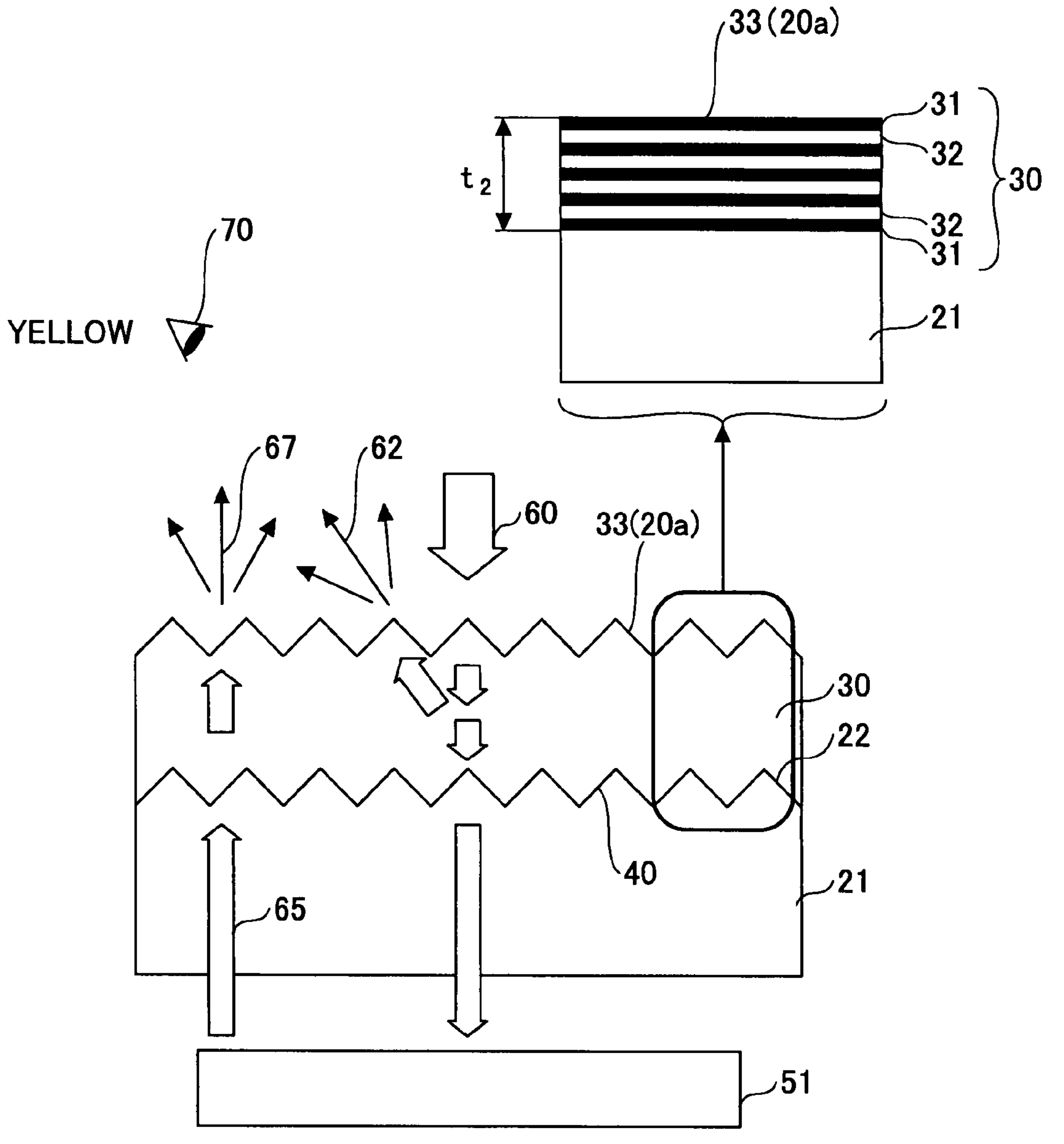
FIG. 2 is a schematic diagram of an optical window member according to a first embodiment of the present invention.
Figure 3:
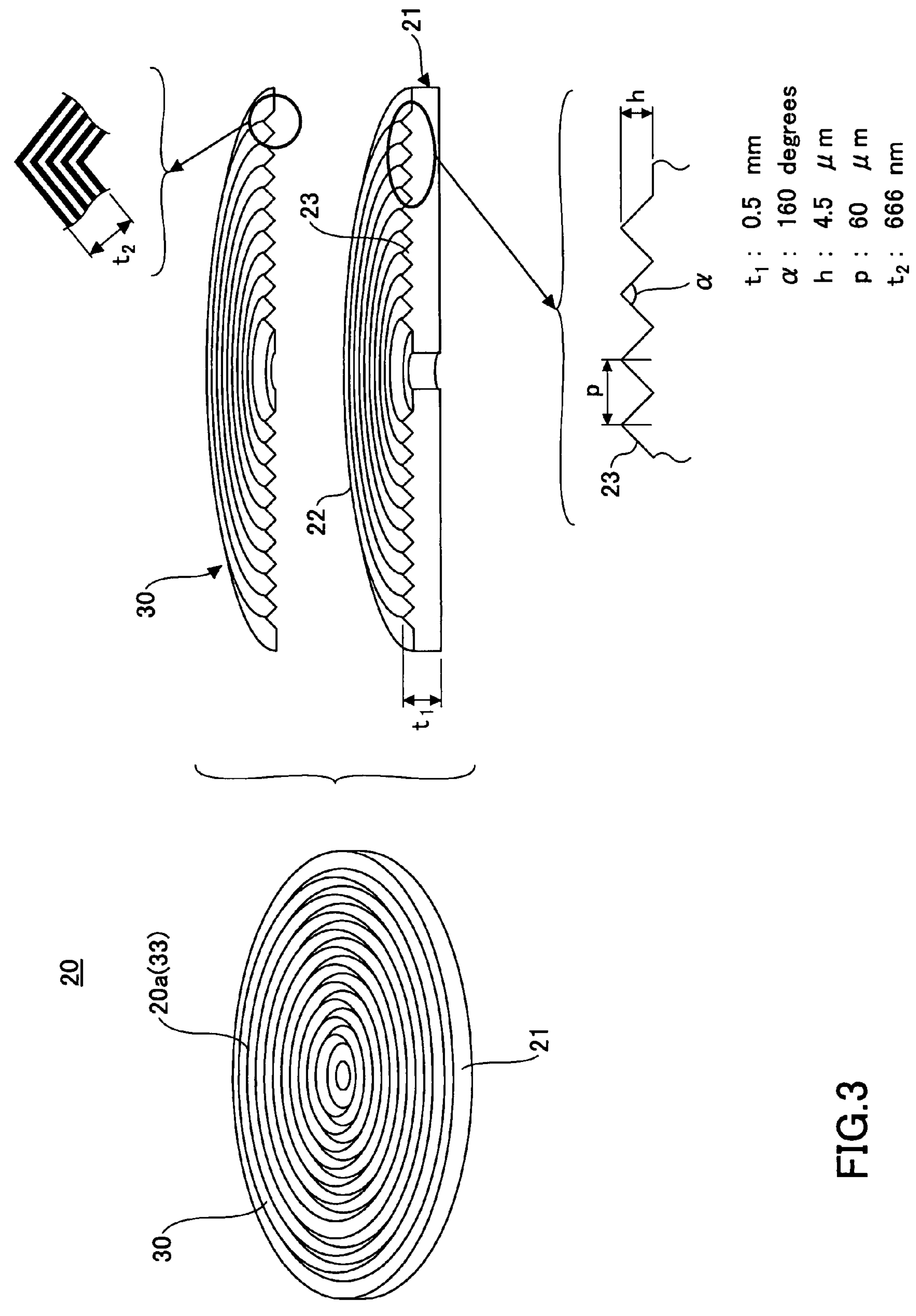
FIG. 3 is a detailed diagram of the optical window member according to the first embodiment of the present invention.
Figures 4, 5:
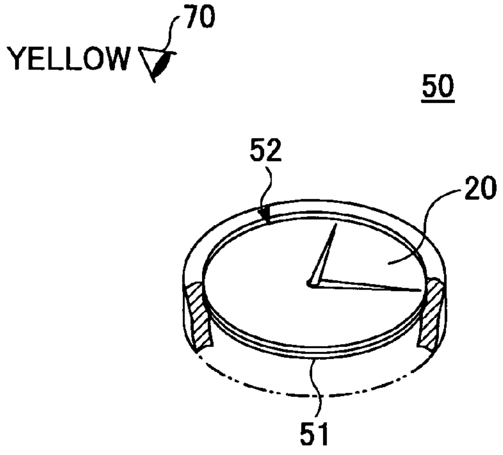
FIG. 4 is an analytical model of a structure with a solar battery covered by the optical window member shown in FIG. 3.
FIG. 5 is a diagram of a watch to which the optical window member is applied.

FIG. 2 is a schematic diagram of an optical window member 20 according to a first embodiment of the present invention. FIG. 3 is a detailed diagram of the optical window member 20. FIG. 4 is an analytical model of a structure with a solar battery 51 covered by the optical window member 20 shown in FIG. 3. The optical window member 20 has a two-layered structure including a plate made of synthetic resin (hereinafter, "transparent resin plate") 21 and an optical thin film 30 arranged on top of the transparent resin plate 21.

The transparent resin plate 21 is made of polycarbonate (PC) with a thickness $t_1$ of 0.5 mm. The transparent resin plate 21 can be made of polyacrylic resin (PMMA) or polyethylene terephthalate (PET), which are both thermoplastic materials, or ABS resin.

The transparent resin plate 21 has a top surface 22 with a protruding/recessed pattern that is fine enough to cause light diffusion. As shown in the enlarged sectional view in FIG. 3, the protruding/recessed pattern has triangular protrusions 23. Each protrusion 23 has an apex angle $\alpha$ of 160 degrees and a height h of 4.5 μm. The protrusions 23 are regularly arranged at a pitch p of 60 μm in a concentric fashion.

In the optical thin film 30, a thin film 31 made of $TiO_2$ (titanium oxide) having a refractive index of 2.17 and a thin film 32 made of $SiO_2$ (silicon dioxide) having a refractive index of 1.47 are laminated alternately, thus forming a structure of nine layers. That is, the thin film 31 made of $TiO_2$ having a higher refractive index than $SiO_2$ and the thin film 32 made of $SiO_2$ having a lower refractive index than the thin film 31 made of $TiO_2$ are laminated alternately. As shown in FIG. 4, the thickness of each thin film 31 made of $TiO_2$ is 74 nm and the thickness of each thin film 32 made of $SiO_2$ is also 74 nm. The total thickness of the films $t_2$ is 666 nm. The optical thin film 30 determines the components of wavelengths of light that are transmitted through and light reflected. A top surface 33 of the optical thin film 30 acts as a top surface 20*a* of the optical window member 20. The optical thin film 30 is formed on the top surface 22 of the transparent resin plate 21 by sputtering or vacuum evaporation. The top surface 33 of the optical thin film 30 (the top surface 20*a* of the optical window member 20) has the same protruding/recessed pattern as the top surface 22 on the transparent resin plate 21.

In FIG. 2, 40 denotes a boundary layer between the top surface 22 of the transparent resin plate 21 and the bottom surface of the optical thin film 30.

As shown in FIG. 5, the optical window member 20 is provided where a dial plate 52 is arranged in a watch 50 with a built-in solar battery 51. The optical window member 20 is covering the solar battery 51.

The solar battery 51 is made of amorphous silicon, and is dark purple.

The solar battery 51 can be formed beneath the transparent resin plate 21 by a PCVD method.

Effects of Each Section of Optical Window Member 20 and Appearance of Dial Plate 52 of Watch 50

Next, a description is given of effects of each section of the optical window member 20 and the appearance of the dial plate 52 of the watch 50 when the optical window member 20 is provided where the dial plate 52 is arranged in the watch 50, which is one example of a device, as shown in FIG. 2. In FIG. 2, the width of the arrow schematically indicates the strength (luminance) of light.

In FIG. 2, 60 denotes light irradiated onto the dial plate 52 of the watch 50. Number 65 denotes light reflected from the surface of the solar battery 51. Part of the light 60 is reflected from the optical thin film 30 and is then diffused; this part of light is denoted by 62. Part of the light 65 reflected from the surface of the solar battery 51 is transmitted through the optical window member 20 and is then diffused; this part of light is denoted by 67. The light 62 and the light 67 enter a human's eye 70 and appear to be a predetermined color.

Figure 6:
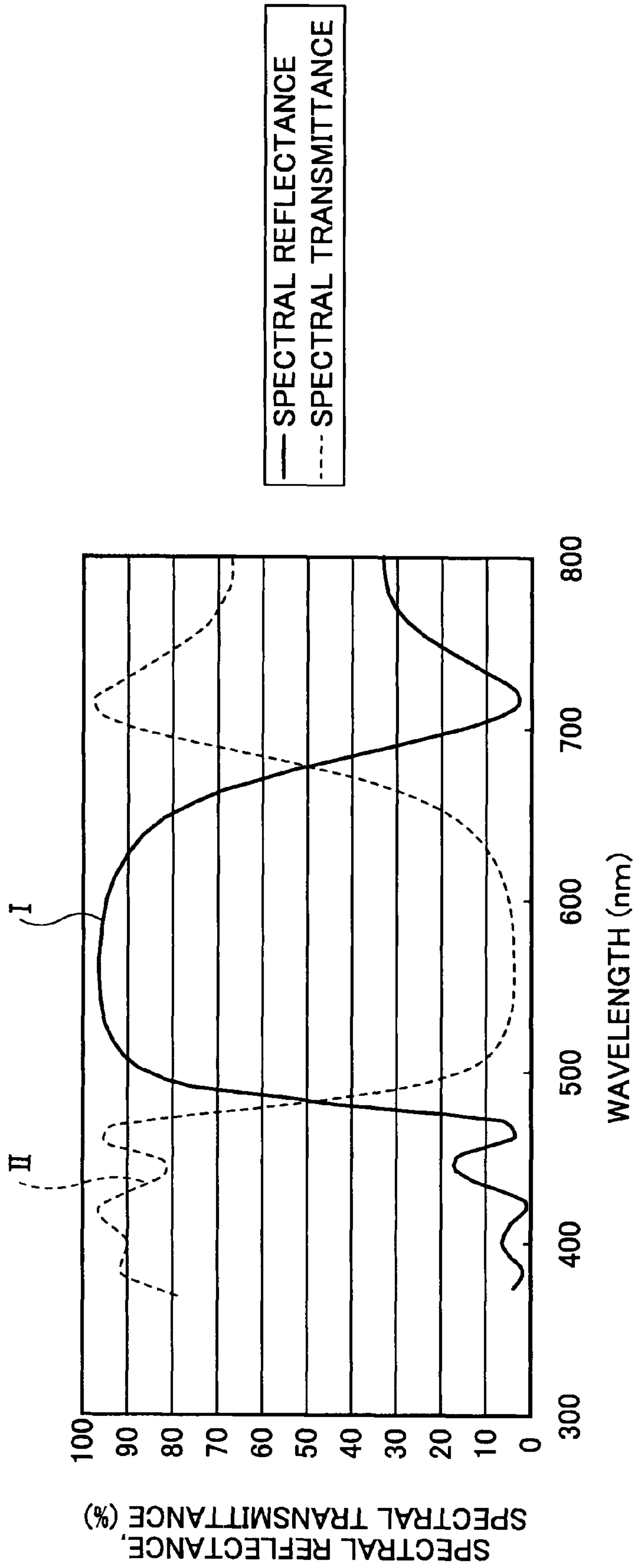
FIG. 6 is a graph indicating spectral reflectance and spectral transmittance of the analytical model shown in FIG. 4.

FIG. 6 is an analytical model of a structure with the optical window member 20 covering a silicon film instead of the solar battery 51. That is, characteristics of the spectral reflectance and the spectral transmittance of the analytical model shown in FIG. 4 are shown in FIG. 6. This analytical model is substantially the same as the structure shown in FIG. 5 where the solar battery 51 is provided beneath the dial plate 52 of the watch 50, except that the surface does not have the protruding/recessed pattern that is fine enough to cause light diffusion.

A line I indicates the spectral reflectance. A light component having a wavelength of approximately 500-600 nm is strongly reflected. Accordingly, the above structure, i.e., the dial plate 52 of the watch 50, appears to be yellow to the human's eye 70. Furthermore, the light diffused at the surface of the optical window member 20 reaches the human's eye 70, and therefore, the solar battery 51 is not visible. Thus, the optical window member 20 provides decorative effects.

In FIG. 6, a line II indicates the spectral transmittance. A light component having a wavelength shorter than approximately 500 nm and a light component having a wavelength longer than approximately 650 nm have high levels of spectral transmittance. Thus, light components having a wavelength shorter than approximately 500 nm and light components having a wavelength longer than approximately 650 nm reach the solar battery 51. Therefore, the solar battery 51 can efficiently generate power.

The characteristics of the spectral reflectance and the spectral transmittance shown in FIG. 6 are results obtained in a simulation. The inventors of the present invention have confirmed that a similar color to that of this simulation is seen when an actually manufactured optical window member 20 is applied to the solar battery 51.

The structure of the protruding/recessed pattern on the top surface of the transparent resin plate 21 is not limited to having protrusions arranged in a concentric fashion; the structure can have linear protrusions arranged in parallel. The number of layers in the optical thin film 30 is not limited to nine; there can be three to several tens (e.g., 40 or 50) of layers, and there can be an even number of layers instead of an odd number of layers. The total thickness of the optical thin film 30 is not limited to 666 nm.

Method of Manufacturing Optical Window Member 20

Next, a method of manufacturing the optical window member 20 is described.

One method of manufacturing the transparent resin plate 21 is to perform injection molding processes using a mold with a fine pattern formed on the inside.

Figure 7:
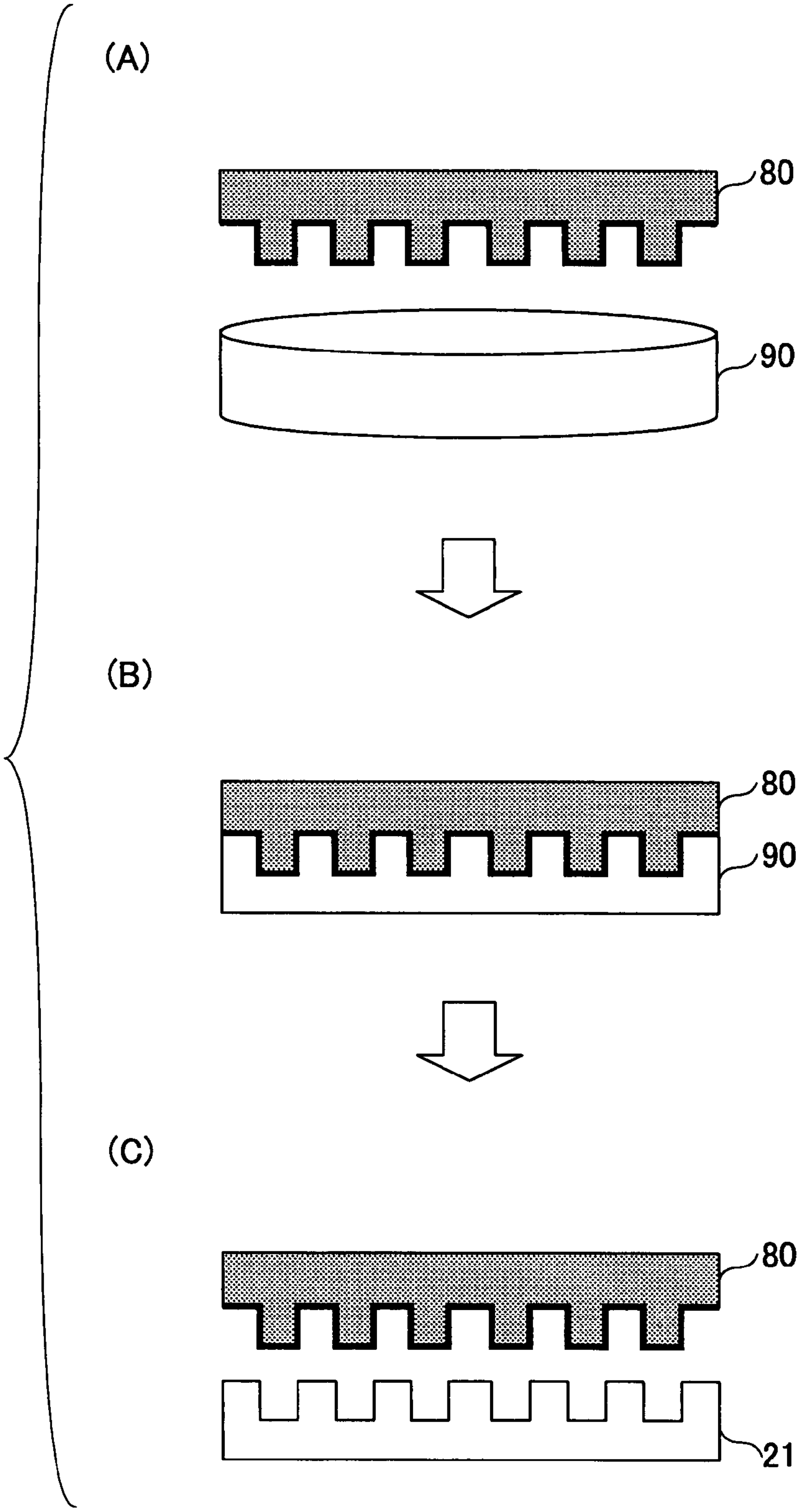
FIG. 7 illustrates a procedure of forming a protruding/recessed pattern on a surface of a transparent resin plate by a nanoimprint technique.

Another method of manufacturing the transparent resin plate 21 is to employ nanoimprint techniques. As shown in FIG. 7(A), a fine-shaped mold 80 and a disk 90 made of polycarbonate (PC) are prepared. The fine-shaped mold 80 and the disk 90 are heated to a temperature that exceeds the glass transition point of polycarbonate resin. As shown in FIG. 7(B), the fine-shaped mold 80 is pressed against the disk 90 at an appropriate pressure for an appropriate length of time. Subsequently, as shown in FIG. 7(C), the fine-shaped mold 80 and the disk 90 are cooled and separated from each other, so that the protruding/recessed pattern is transferred to and formed on the disk 90 and the transparent resin plate 21 is manufactured. The material of the disk 90 is not limited to polycarbonate as long as it is a thermoplastic resin.

Figure 8:
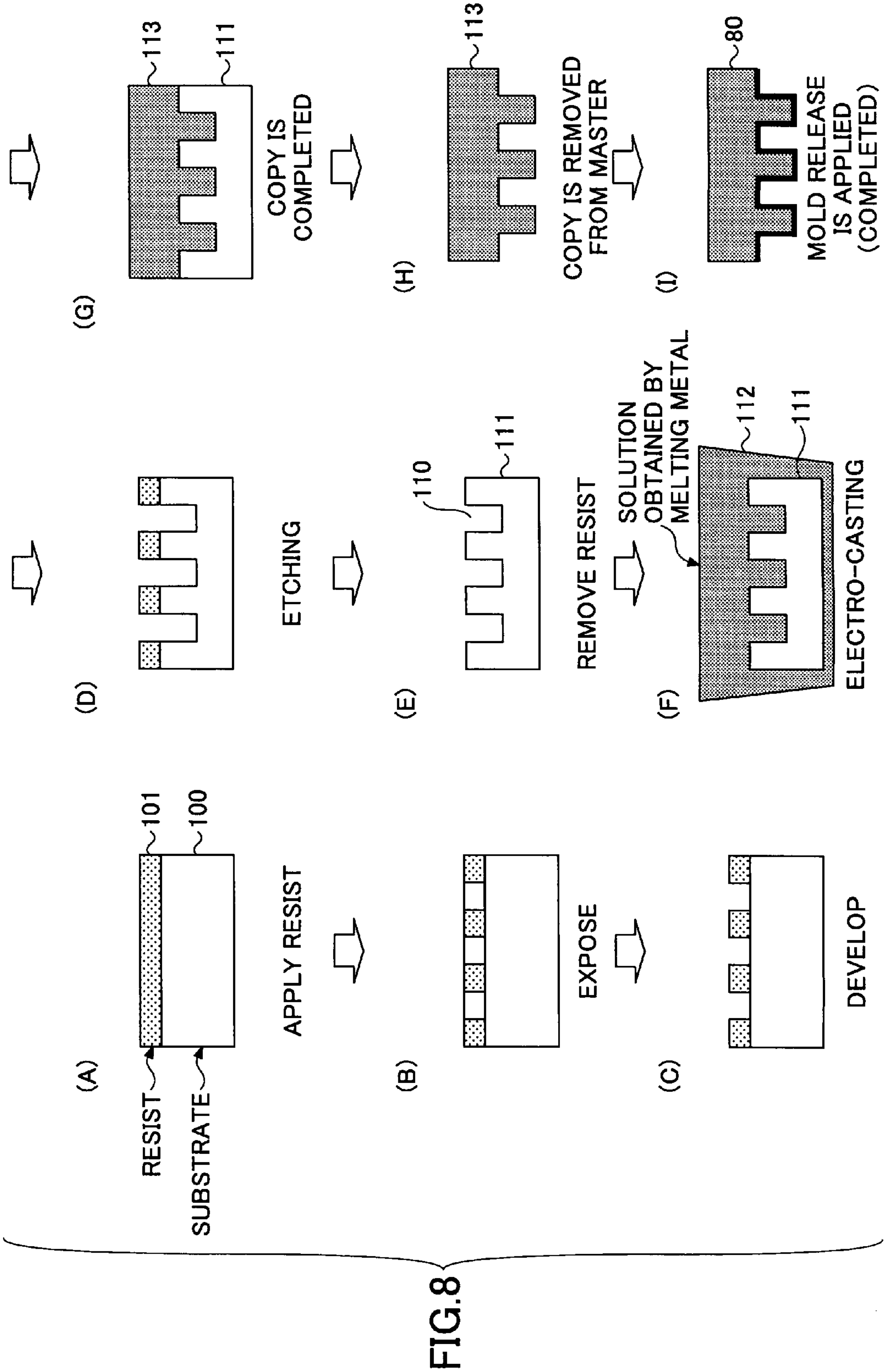
FIG. 8 illustrates a procedure of manufacturing a fine-shaped mold.

The fine-shaped mold 80 is manufactured by employing a photolithography technique and an electro-casting technique as shown in FIG. 8. First, as shown in FIG. 8(A), a resist film 101 is coated on the top surface of a substrate 100. Next, the resist film 101 is exposed (FIG. 8(B)), developed (FIG. 8(C)), and etched (FIG. 8(D)). Then, the resist film is removed from the substrate 100 (FIG. 8(E)) to form a fine protruding/recessed pattern, thereby forming a master 111. Next, electrocasting is performed by placing the master 111 in a solution obtained by melting metal 112 (FIG. 8(F)) to manufacture a copy 113 (FIG. 8(G)), the copy 113 is removed from the master 111 (FIG. 8(H)), and finally, mold release is applied (FIG. 8(I)), thereby completing the fine-shaped mold 80. The application of mold release is optional. The master 111 can be formed by employing a stereo lithography technique.

The optical thin film 30 is formed by sputtering both the thin film 31 made of $TiO_2$ and the thin film 32 made of $SiO_2$.

As described above, the optical window member 20 has a two-layered structure including the optical thin film 30 sputtered on top of the transparent resin plate 21, and therefore, the manufacturing cost is lower than that of a conventional optical window member.

Other Embodiments of Optical Window Member 20

Next, other embodiments of the optical window member 20 are described.

Various modifications of the optical window member 20 can be made by appropriately combining modifications of the optical thin film 30 and modifications of the transparent resin plate 21.

The optical thin film 30 functions as an optical filter, and by changing its structure and thickness, the color of the surface of the optical window member 20 can be changed. The number of layers in the optical thin film 30 is not limited to nine; there can be three to several tens (e.g., 40 or 50) of layers, and there can be an even number of layers instead of an odd number of layers. By changing the fineness of the protruding/recessed pattern on the top surface 22 of the transparent resin plate 21, the light is diffused in different manners, and therefore, it is possible to change the saturation and the brightness of the color of the surface of the optical window member 20.

Second Embodiment

Figure 9:
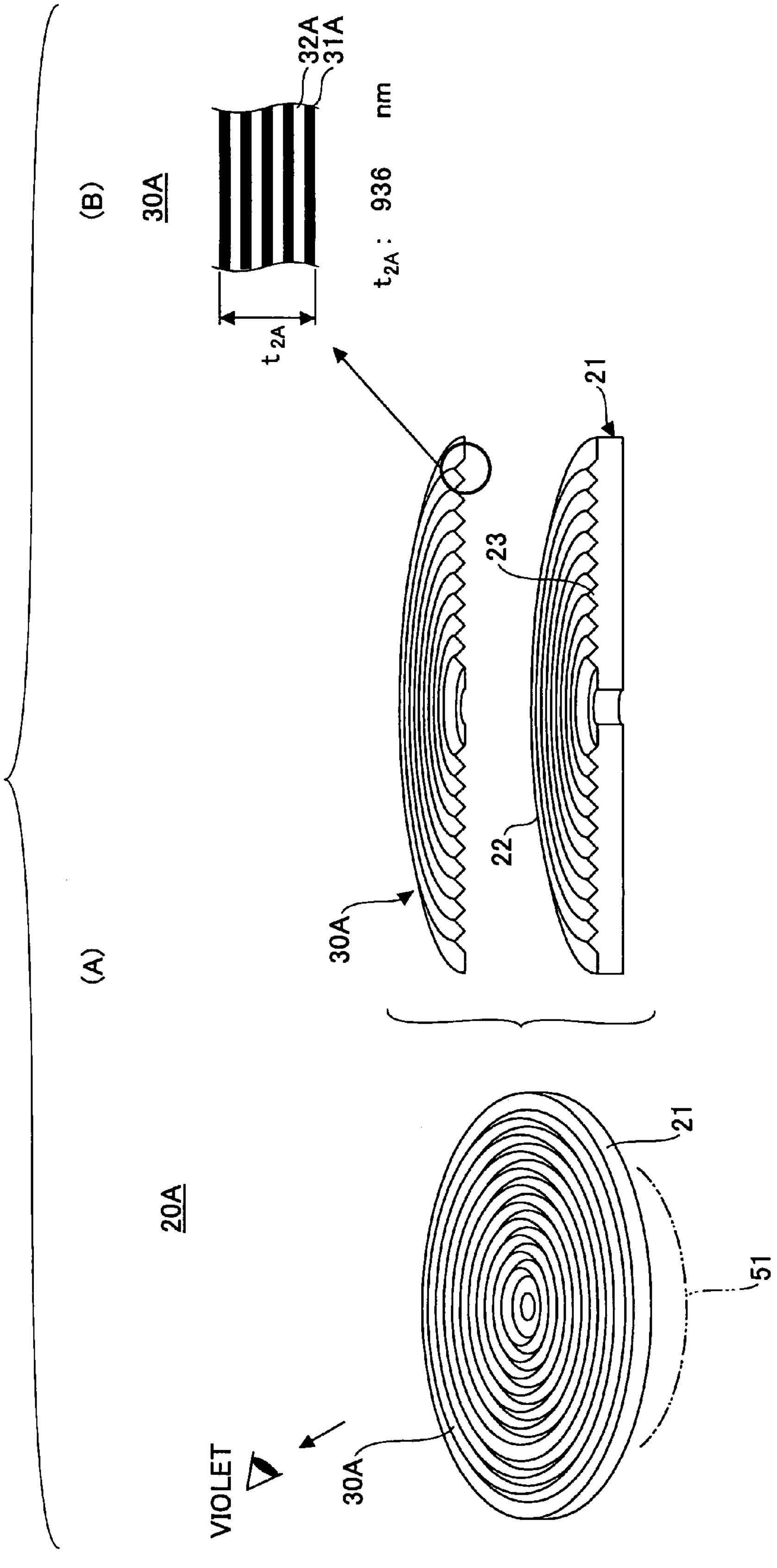
FIG. 9 is a schematic diagram of an optical window member according to a second embodiment of the present invention.

FIG. 9(A) is a diagram of an optical window member 20A according to a second embodiment of the present invention. FIG. 10 is an analytical model of a structure with the solar battery 51 covered by the optical window member 20A shown in FIG. 9(A). Compared to the optical window member 20 shown in FIG. 3, the optical window member 20A has a different optical thin film; i.e., an optical thin film 30A is formed on the transparent resin plate 21. As shown in FIG. 9(B) and FIG. 10, the optical thin film 30A is formed by alternately laminating a thin film 31A made of $TiO_2$ and a thin film 32A made of $SiO_2$, thus forming a structure of nine layers. The thickness of each thin film 31A made of $TiO_2$ is 104 nm and the thickness of each thin film 32A made of $SiO_2$ is also 104 nm. The total thickness of the films $t_{2A}$ is 936 nm.

Figure 11:
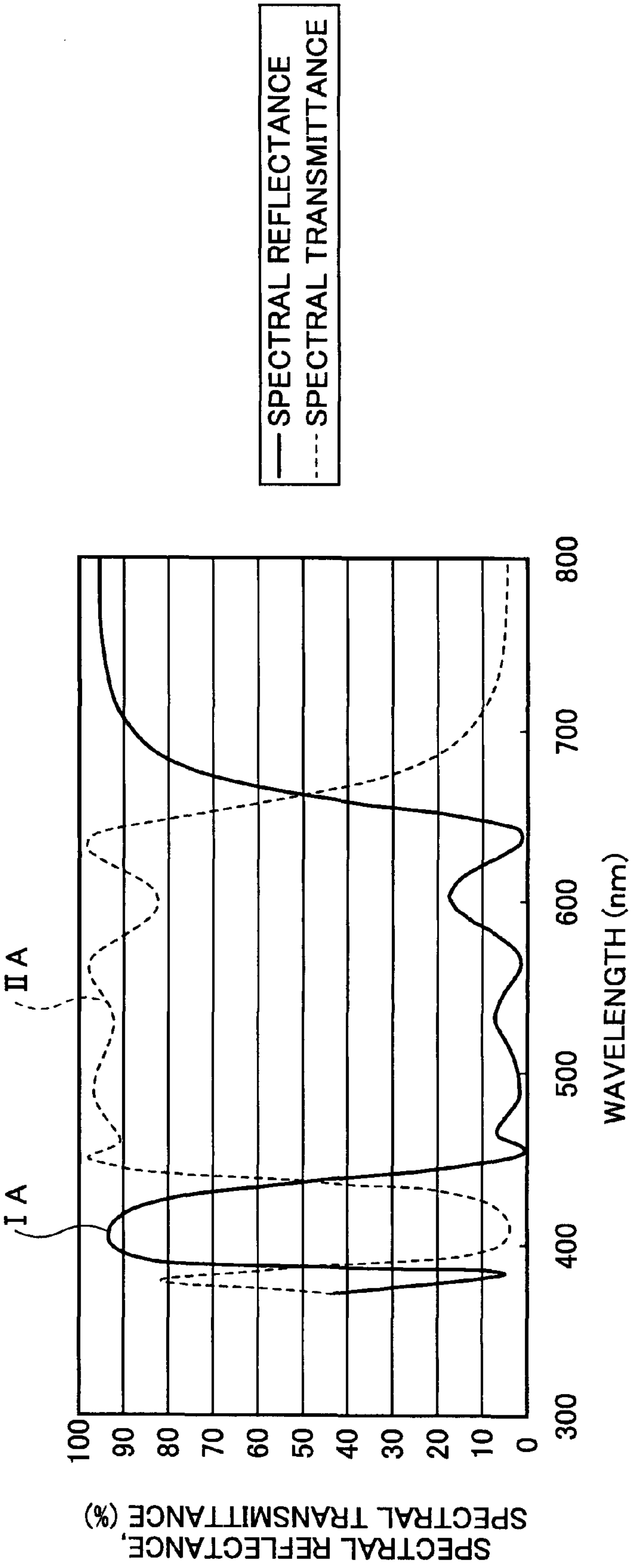
FIG. 11 is a graph indicating spectral reflectance and spectral transmittance of the analytical model shown in FIG. 10.

FIG. 11 illustrates characteristics of the spectral reflectance and the spectral transmittance of the analytical model shown in FIG. 10. This analytical model is substantially the same as the structure shown in FIG. 5 where the solar battery 51 is provided beneath the dial plate 52 of the watch 50, except that the surface does not have the protruding/recessed pattern that is fine enough to cause light diffusion. Furthermore, the characteristics of the spectral reflectance and the spectral transmittance are results obtained in a simulation.

A line IA indicates the spectral reflectance. A light component having a wavelength of approximately 400 nm and a light component having a wavelength of approximately 700 nm are strongly reflected. Accordingly, the above structure, i.e., the dial plate 52 of the watch 50, appears to be violet to the human's eye 70. Furthermore, the light diffused at the surface of the optical window member 20 reaches the human's eye 70, and therefore, the solar battery 51 is not visible. Thus, the optical window member 20 provides decorative effects.

In FIG. 11, a line IIA indicates the spectral transmittance. A light component having a wavelength of approximately 450-650 nm has a high level of spectral transmittance. Thus, light components having a wavelength of approximately 450-650 nm reach the solar battery 51. Therefore, the solar battery 51 can efficiently generate power.

The characteristics of the spectral reflectance and the spectral transmittance shown in FIG. 11 are results obtained in a simulation. The inventors of the present invention have confirmed that a similar color to that of this simulation is seen when an actually manufactured optical window member 20A is applied to the solar battery 51.

Third Embodiment

Figure 12:
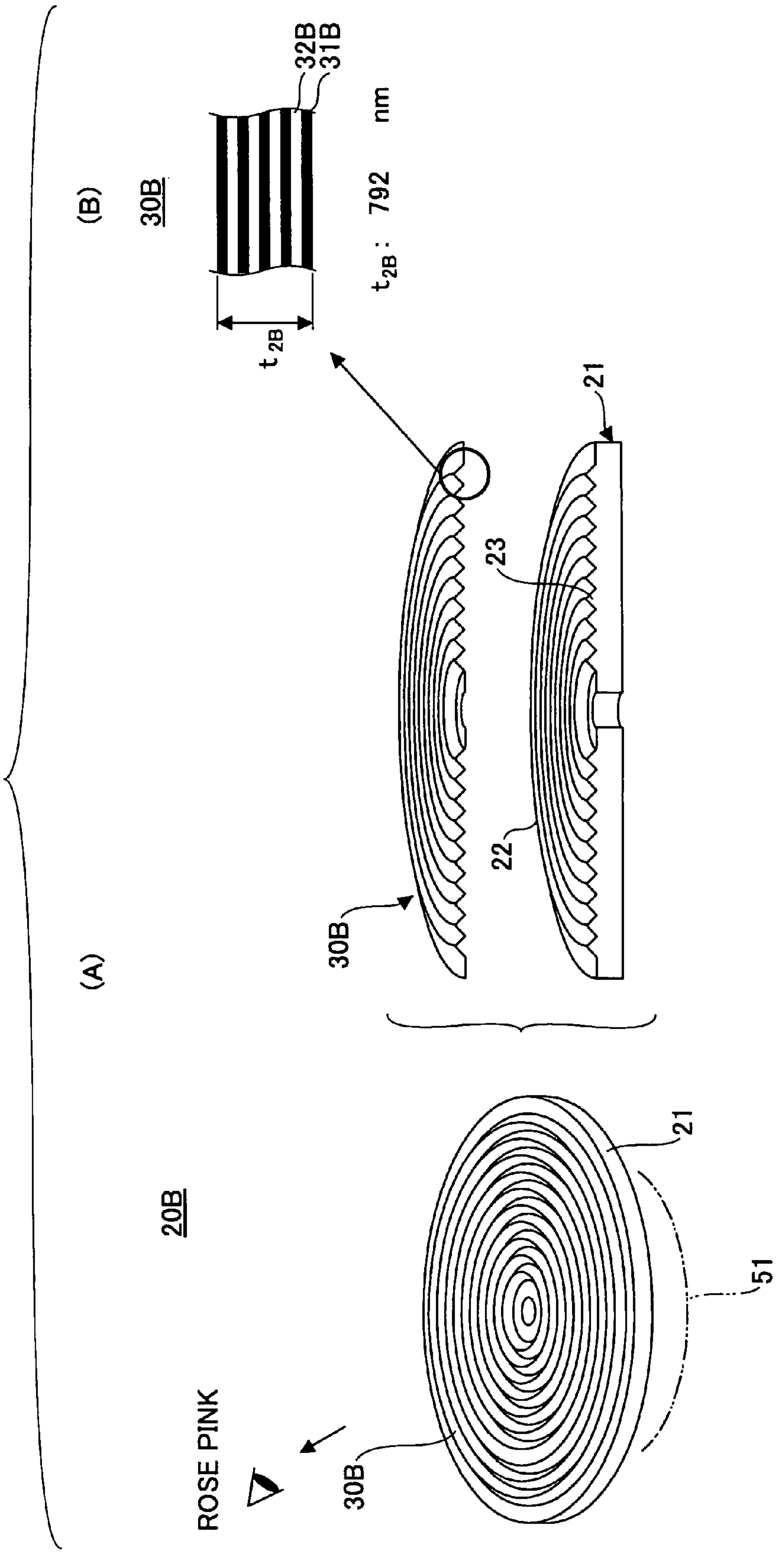
FIG. 12 is a schematic diagram of an optical window member according to a third embodiment of the present invention.

FIG. 12(A) is a diagram of an optical window member 20B according to a third embodiment of the present invention. FIG. 13 is an analytical model of a structure with the solar battery 51 covered by the optical window member 20B shown in FIG. 12(A). Compared to the optical window member 20 shown in FIG. 3, the optical window member 20B has a different optical thin film; i.e., an optical thin film 30B is formed on the transparent resin plate 21. As shown in FIG. 12(B) and FIG. 13, the optical thin film 30B is formed by alternately laminating a thin film 31B made of $TiO_2$ and a thin film 32B made of $SiO_2$, thus forming a structure of nine layers. The thickness of each thin film 31B made of $TiO_2$ is 88 nm and the thickness of each thin film 32B made of $SiO_2$ is also 88 nm. The total thickness of the films $t_{2B}$ is 792 nm.

Figure 14:
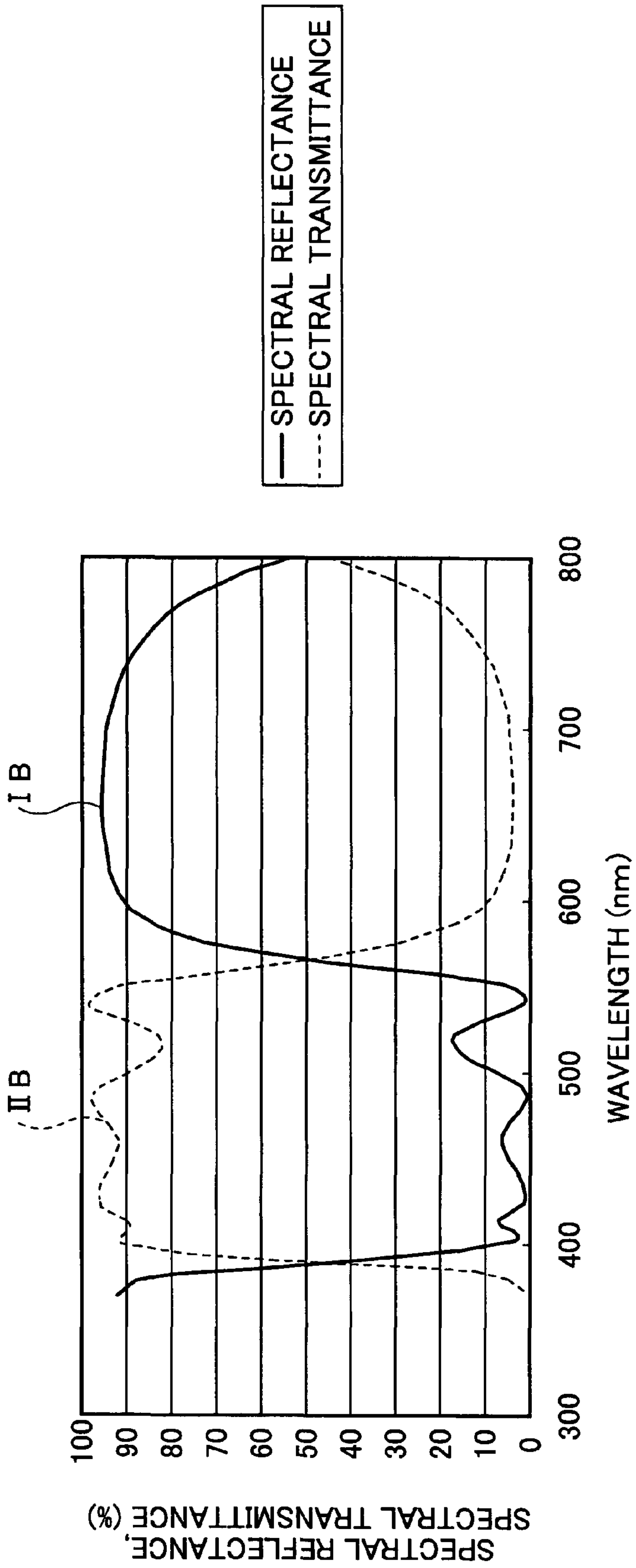
FIG. 14 is a graph indicating spectral reflectance and spectral transmittance of the analytical model shown in FIG. 13.

FIG. 14 illustrates characteristics of the spectral reflectance and the spectral transmittance of the analytical model shown in FIG. 13. This analytical model is substantially the same as the structure shown in FIG. 5 where the solar battery 51 is provided beneath the dial plate 52 of the watch 50, except that the surface does not have the protruding/recessed pattern that is fine enough to cause light diffusion. Furthermore, the characteristics of the spectral reflectance and the spectral transmittance are results obtained in a simulation.

A line IB indicates the spectral reflectance. A light component having a wavelength longer than approximately 600 nm and a light component having a wavelength shorter than approximately 400 nm are strongly reflected. Accordingly, the above structure, i.e., the dial plate 52 of the watch 50, appears to be rose pink (pink near red) to the human's eye 70. Furthermore, the light diffused at the surface of the optical window member 20 reaches the human's eye 70, and therefore, the solar battery 51 is not visible. Thus, the optical window member 20 provides decorative effects.

In FIG. 14, a line IIB indicates the spectral transmittance. A light component having a wavelength of approximately 400-600 nm has a high level of spectral transmittance. Thus, light components having a wavelength of approximately 400-600 nm reach the solar battery 51. Therefore, the solar battery 51 can efficiently generate power.

The characteristics of the spectral reflectance and the spectral transmittance shown in FIG. 14 are results obtained in a simulation. The inventors of the present invention have confirmed that a similar color to that of this simulation is seen when an actually manufactured optical window member 20B is applied to the solar battery 51.

Fourth Embodiment

Figure 15B:
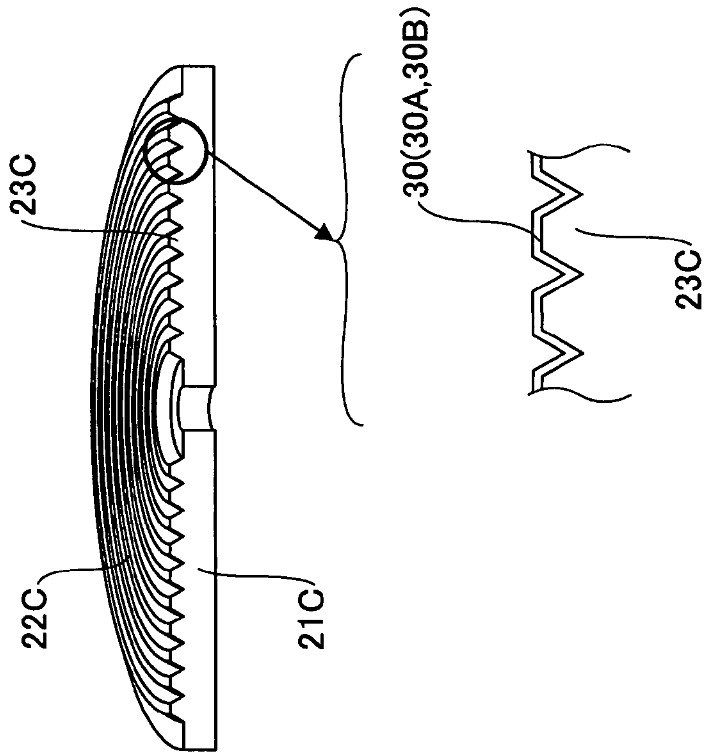
FIGS. 15A, 15B are schematic diagrams of an optical window member according to a fourth embodiment of the present invention.
Figure 15A:
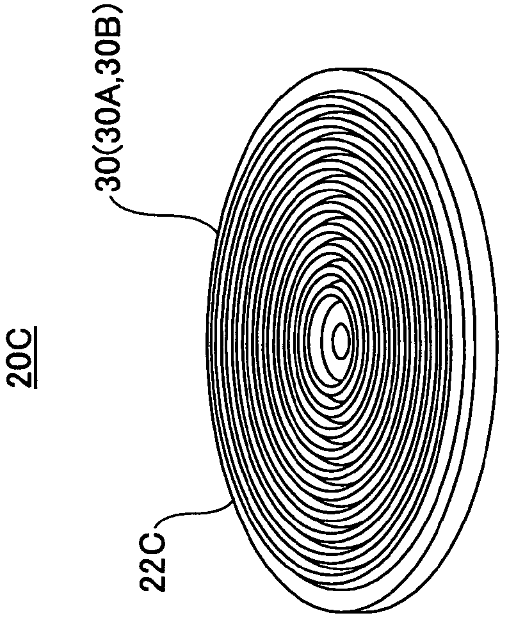

FIGS. 15A, 15B illustrate an optical window member 20C according to a fourth embodiment of the present invention.

The optical window member 20C has any one of the optical thin films 30, 30A, or 30B formed on a top surface 22C of a transparent resin plate 21C. The protruding/recessed pattern on the top surface 22C of the transparent resin plate 21C has protrusions 23C with trapezoidal sectional shapes. The protrusions 23C are regularly arranged in a concentric fashion.

When this optical window member 20C is provided, the solar battery 51 is not visible, and the dial plate 52 of the watch 50 appears to be yellow when the optical thin film 30 is employed, violet when the optical thin film 30A is employed, and rose pink when the optical thin film 30B is employed; and the saturation appears to be different compared to the case of the optical window member 20.

Fifth Embodiment

Figure 16A:
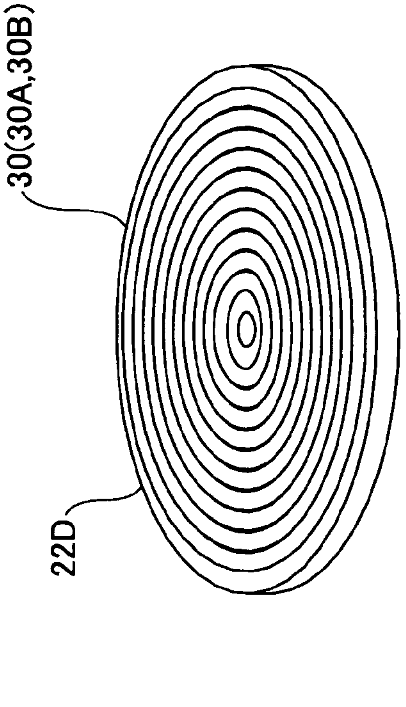
FIGS. 16A, 16B are schematic diagrams of an optical window member according to a fifth embodiment of the present invention.
Figure 16B:
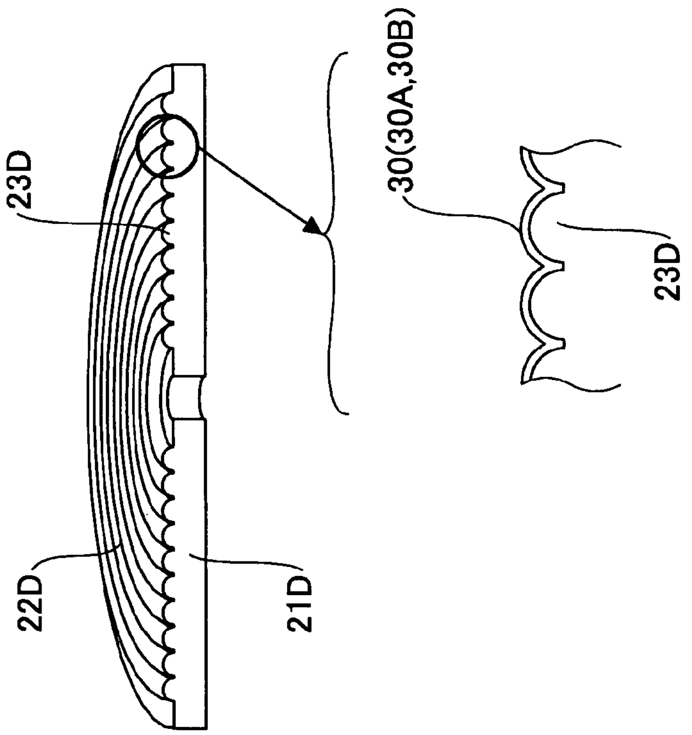

FIGS. 16A, 16B illustrate an optical window member 20D according to a fifth embodiment of the present invention. The optical window member 20D has any one of the optical thin films 30, 30A, or 30B formed on a top surface 22D of a transparent resin plate 21D. The protruding/recessed pattern on the top surface 22D of the transparent resin plate 21D has protrusions 23D with semicircular sectional shapes. The protrusions 23D are regularly arranged in a concentric fashion.

When this optical window member 20D is provided, the solar battery 51 is not visible, and the dial plate 52 of the watch 50 appears to be yellow when the optical thin film 30 is employed, violet when the optical thin film 30A is employed, and rose pink when the optical thin film 30B is employed; and the saturation appears to be different compared to the case of the optical window member 20.

Sixth Embodiment

Figure 17A:
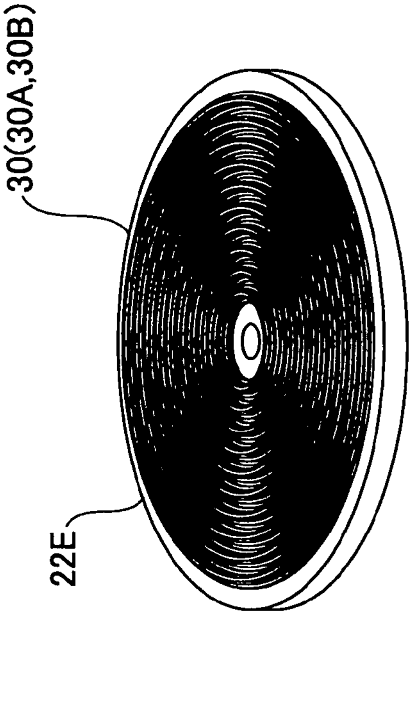
FIGS. 17A, 17B are schematic diagrams of an optical window member according to a sixth embodiment of the present invention.
Figure 17B:
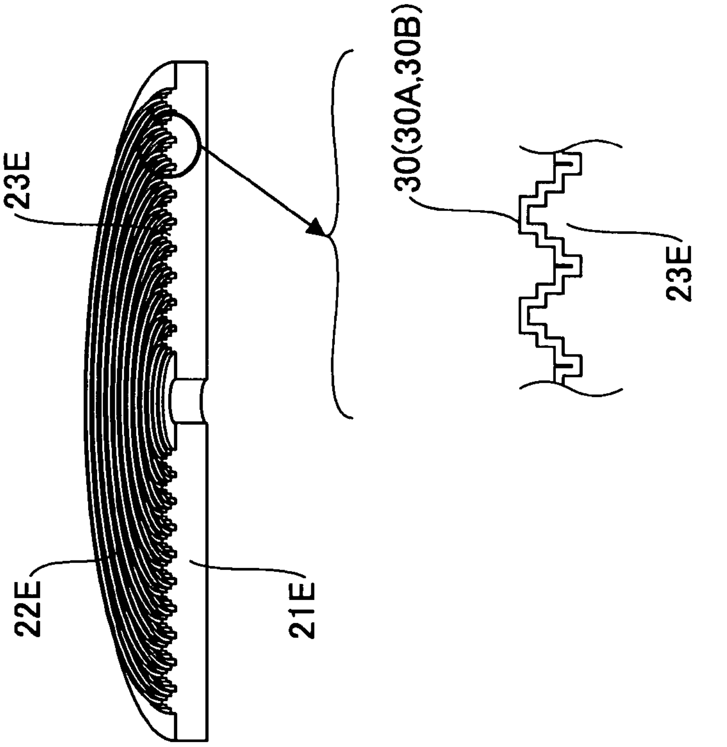

FIGS. 17A, 17B illustrate an optical window member 20E according to a sixth embodiment of the present invention. The optical window member 20E has any one of the optical thin films 30, 30A, or 30B formed on a top surface 22E of a transparent resin plate 21E. The protruding/recessed pattern on the top surface 22E of the transparent resin plate 21E has protrusions 23E that are regularly arranged in a concentric fashion. The sectional shape of each protrusion 23E appears to have three rectangles with different lengths stacked on top of each other in order of length with the longest one at the bottom, i.e., the sectional shape is a trapezoid whose oblique sides are both staircase-like lines.

When this optical window member 20E is provided, the solar battery 51 is not visible, and the dial plate 52 of the watch 50 appears to be yellow when the optical thin film 30 is employed, violet when the optical thin film 30A is employed, and rose pink when the optical thin film 30B is employed; and the saturation and the brightness appear to be different compared to the case of the optical window member 20.

Seventh Embodiment

Figure 18B:
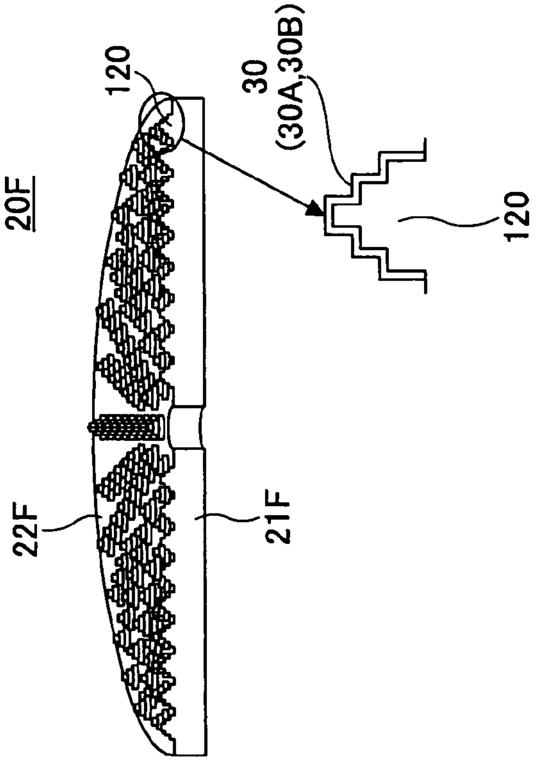
FIGS. 18A, 18B are schematic diagrams of an optical window member according to a seventh embodiment of the present invention.
Figure 18A:
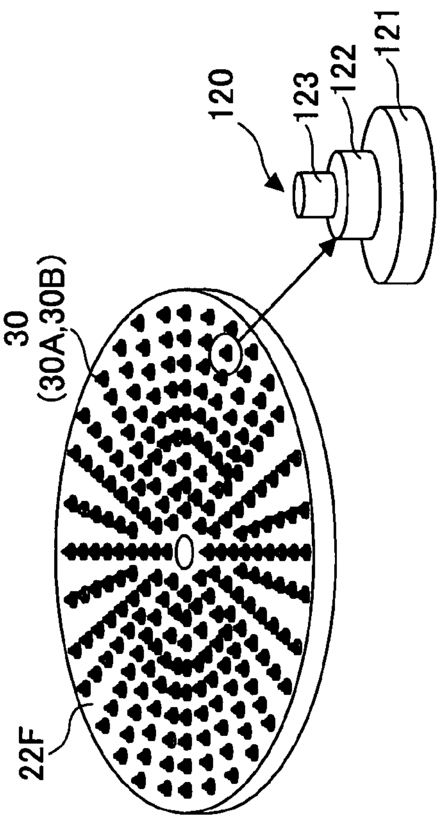

FIGS. 18A, 18B illustrate an optical window member 20F according to a seventh embodiment of the present invention. The optical window member 20F has any one of the optical thin films 30, 30A, or 30B formed on a top surface 22F of a transparent resin plate 21F. The protruding/recessed pattern on the top surface 22F of the transparent resin plate 21F has multiple protrusions 120 that are radially arranged in a concentric fashion. Each protrusion 120 has a shape in which three disks 121, 122, and 123 with different diameters are stacked on top of each other in order of the diameter size, with the largest one arranged at the bottom.

When this optical window member 20F is provided, the solar battery 51 is not visible, and the dial plate 52 of the watch 50 appears to be yellow when the optical thin film 30 is employed, violet when the optical thin film 30A is employed, and rose pink when the optical thin film 30B is employed; and the saturation and the brightness appear to be different compared to the case of the optical window member 20.

Eighth Embodiment

Figures 19A, 19B:
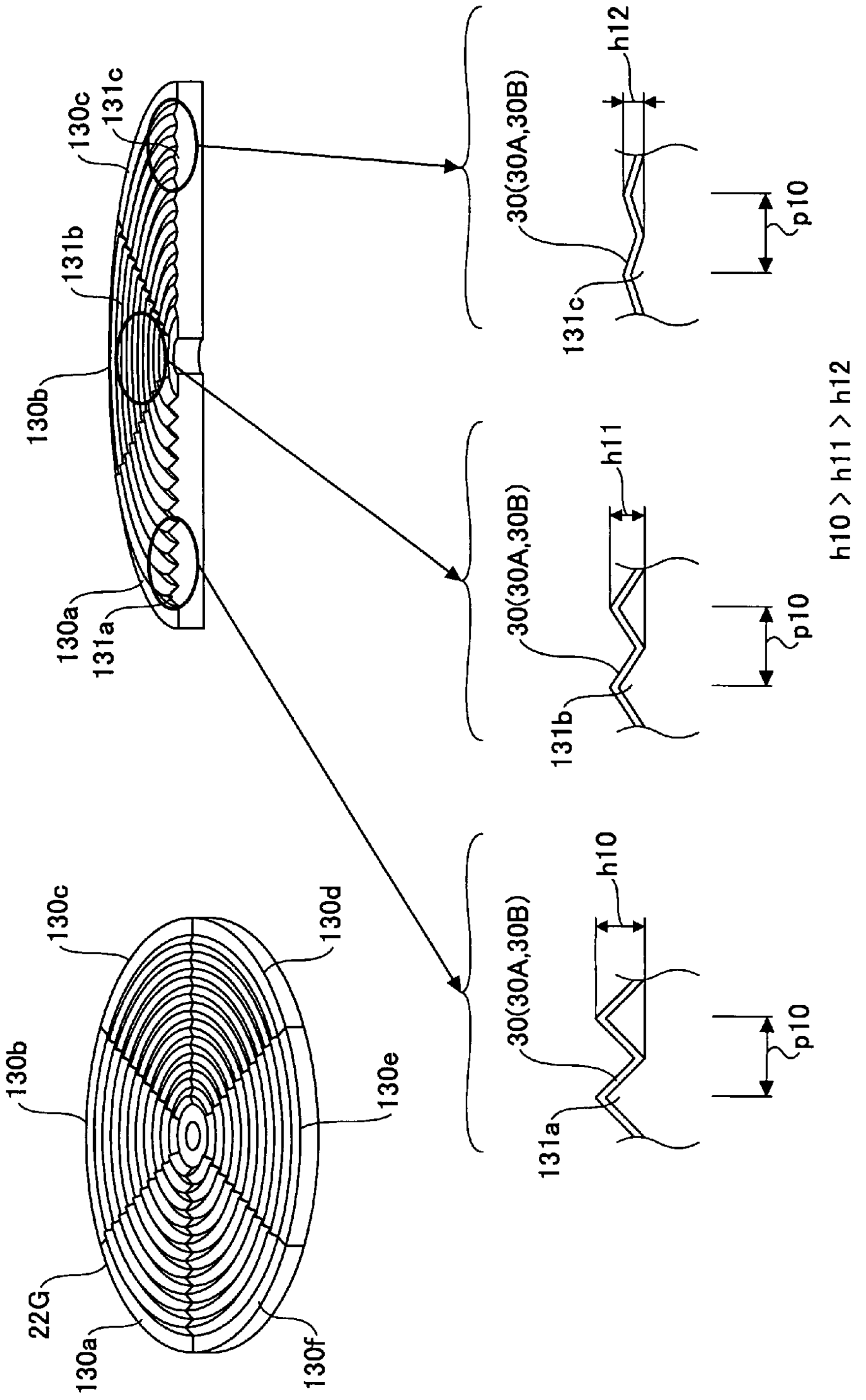
FIGS. 19A, 19B are schematic diagrams of an optical window member according to an eighth embodiment of the present invention.

FIGS. 19A, 19B illustrate an optical window member 20G according to an eighth embodiment of the present invention. The optical window member 20G has any one of the optical thin films 30, 30A, or 30B formed on a top surface 22G of a transparent resin plate 21G. The pattern on the top surface 22G of the transparent resin plate 21G is divided into six sections 130*a*-130*f* in the circumferential direction. The pattern in each of the sections 130*a*-130*f* includes protrusions 131*a*, etc., with triangular sectional shapes extending in circular arcs and formed in a concentric fashion. The protrusions 131*a*, etc., are arranged at the same pitch p10 in all of the sections 130*a*-130*f*. However, the triangular sectional shapes of the protrusions 131*a*, etc., are different in each section 130*a*-130*f*; in the section 130*a*, the triangular sectional shape of the protrusion 131*a* has a height h10; in the section 130*b*, the triangular sectional shape of a protrusion 131*b* has a height h11 that is lower than h10; and in the section 130*c*, the triangular sectional shape of a protrusion 131*c* has a height h12 that is lower than h11.

When this optical window member 20G is provided, the solar battery 51 is not visible, and the dial plate 52 of the watch 50 appears to be yellow when the optical thin film 30 is employed, violet when the optical thin film 30A is employed, and rose pink when the optical thin film 30B is employed; and the saturation and the brightness appear to be different compared to the case of the optical window member 20.

Ninth Embodiment

Figure 20:
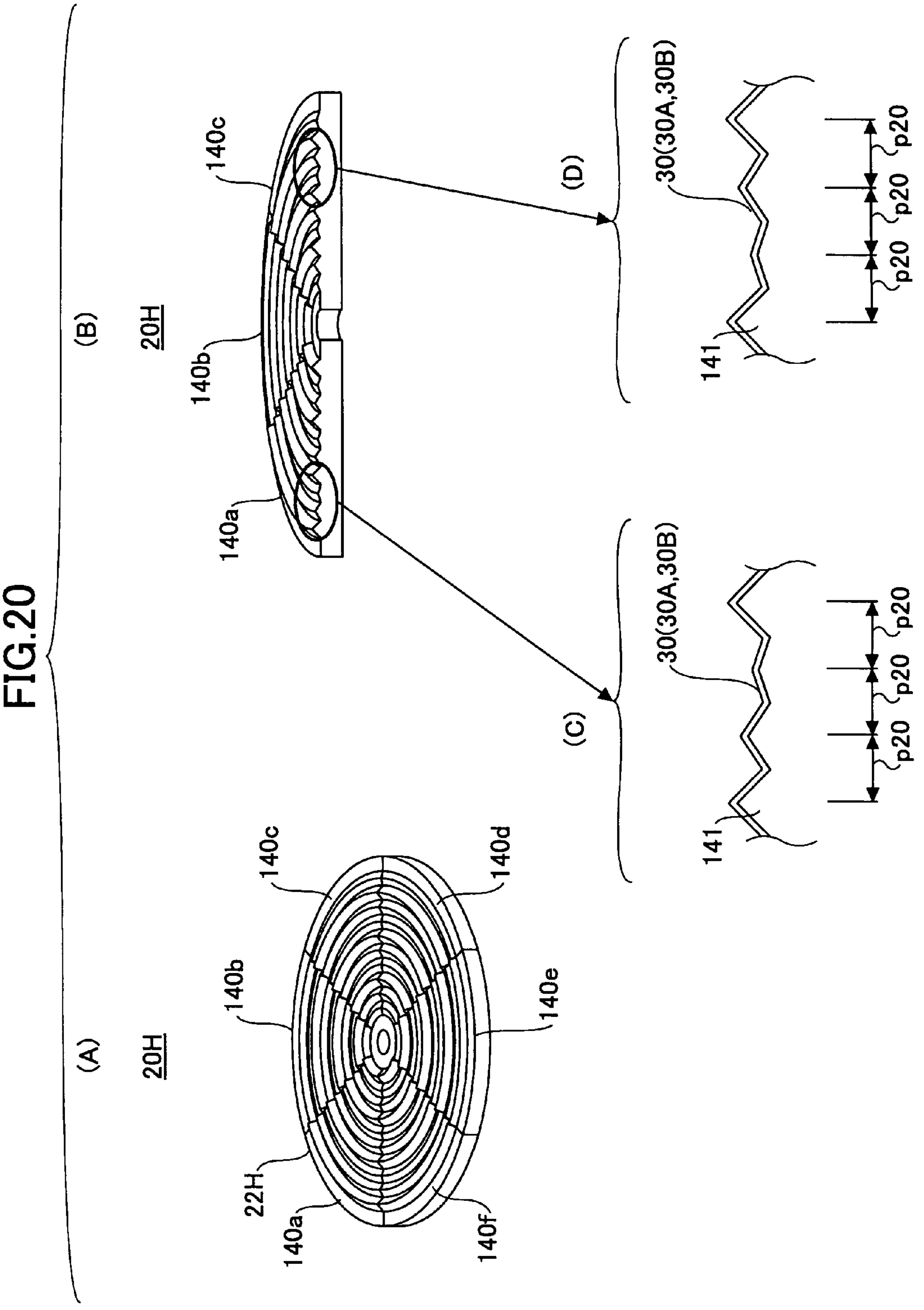
FIG. 20 is a schematic diagram of an optical window member according to a ninth embodiment of the present invention.

FIG. 20 illustrates an optical window member 20H according to a ninth embodiment of the present invention. The optical window member 20H has any one of the optical thin films 30, 30A, or 30B formed on a top surface 22H of a transparent resin plate 21H. The pattern on the top surface 22H of the transparent resin plate 21H is divided into six sections 140*a*-140*f* in the circumferential direction. As shown in FIG. 20(C), the pattern in the section 140*a* includes protrusions 141 with triangular sectional shapes of different heights extending in circular arcs and arranged at a pitch p20. As shown in FIG. 20(D), the pattern in the section 140*c* includes the protrusions 141 with triangular sectional shapes of different heights extending in circular arcs and arranged at the pitch p20. As shown in FIGS. 20(C) and (D), the protrusions 141 with triangular sectional shapes of different heights are arranged in different orders in the section 140*a* and the section 140*c*. In the other sections 140*b* and 140*d*-140*f*, the protrusions 141 with triangular sectional shapes of different heights extending in circular arcs are arranged at the pitch p20. The protrusions 141 of different heights are arranged in different orders in the sections 140*b* and 140*d*-140*f*. That is, the protruding/recessed pattern is different in each section and is irregular even within the same section.

When this optical window member 20H is provided, the solar battery 51 is not visible, and the dial plate 52 of the watch 50 appears to be yellow when the optical thin film 30 is employed, violet when the optical thin film 30A is employed, and rose pink when the optical thin film 30B is employed. The color tone appears to be different compared to the case of the optical window member 20, and the color appears to have a unique nuance in each of the sections 140*a*-140*f* and at different locations within each section 140*a*-140*f*.

Another Usage Mode of Optical Window Member 20

Figure 21:
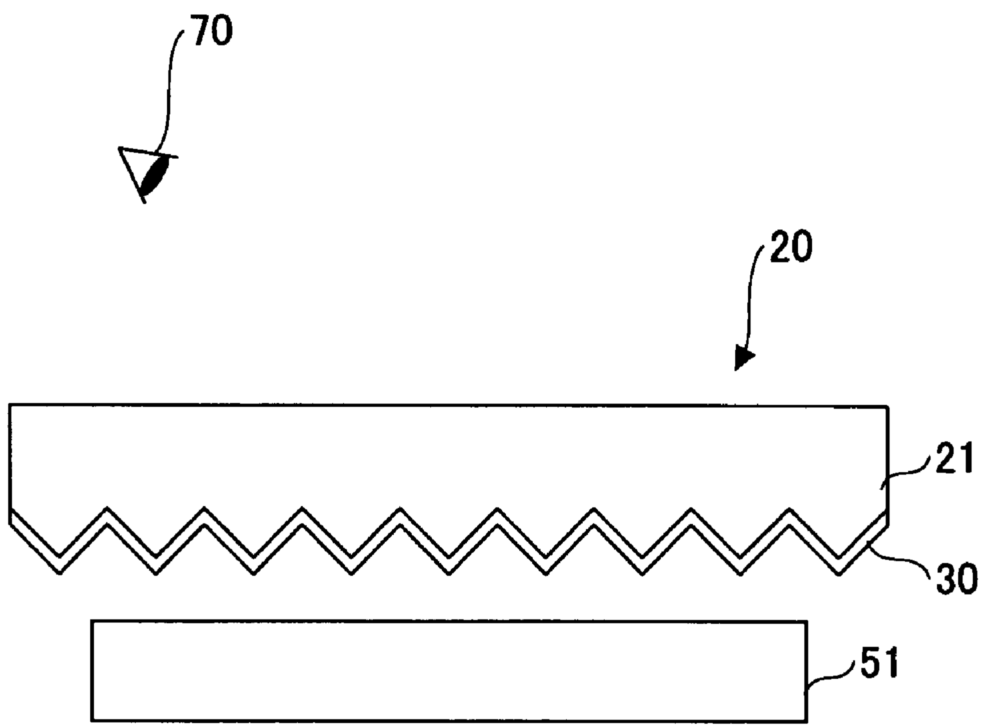
FIG. 21 illustrates another usage mode of the optical window member according to the first embodiment of the present invention.

The optical window members 20-20H can be used in another mode as shown in FIG. 21. That is, the surface with the optical thin film 30, etc., is facing the solar battery 51. Even when the optical window members 20-20H are used in this mode, the solar battery 51 is not visible.

Other Applications of the Optical Window Member 20

Figure 22A:
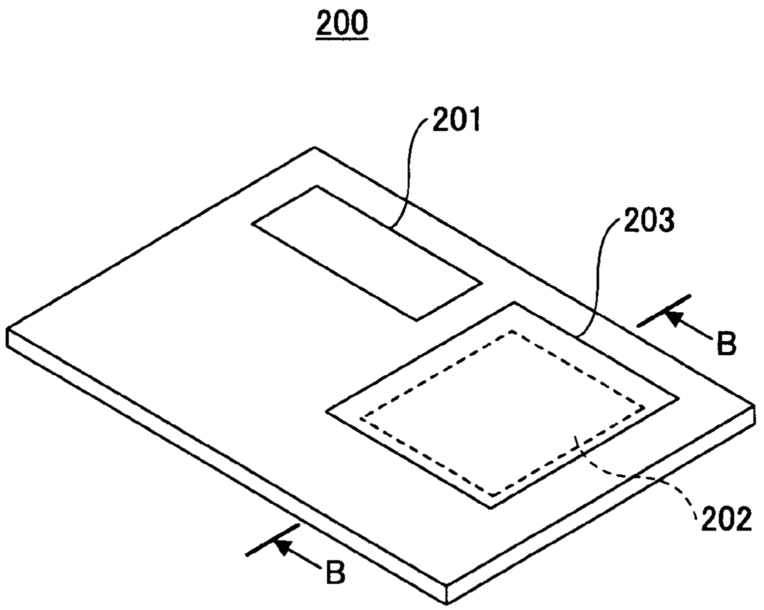
FIGS. 22A, 22B illustrate a card to which an optical window member according to an embodiment of the present invention is applied.
Figure 22B:
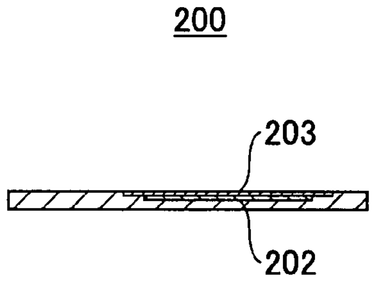

Other applications of the optical window members 20-20G are described below. As shown in FIGS. 22A, 22B, a card 200, which is one example of a device, has a liquid crystal display 201 and a built-in solar battery 202 for providing power to the liquid crystal display 201. An embodiment of the present invention can be applied as an optical window member 203 covering the solar battery 202.

Figure 23:
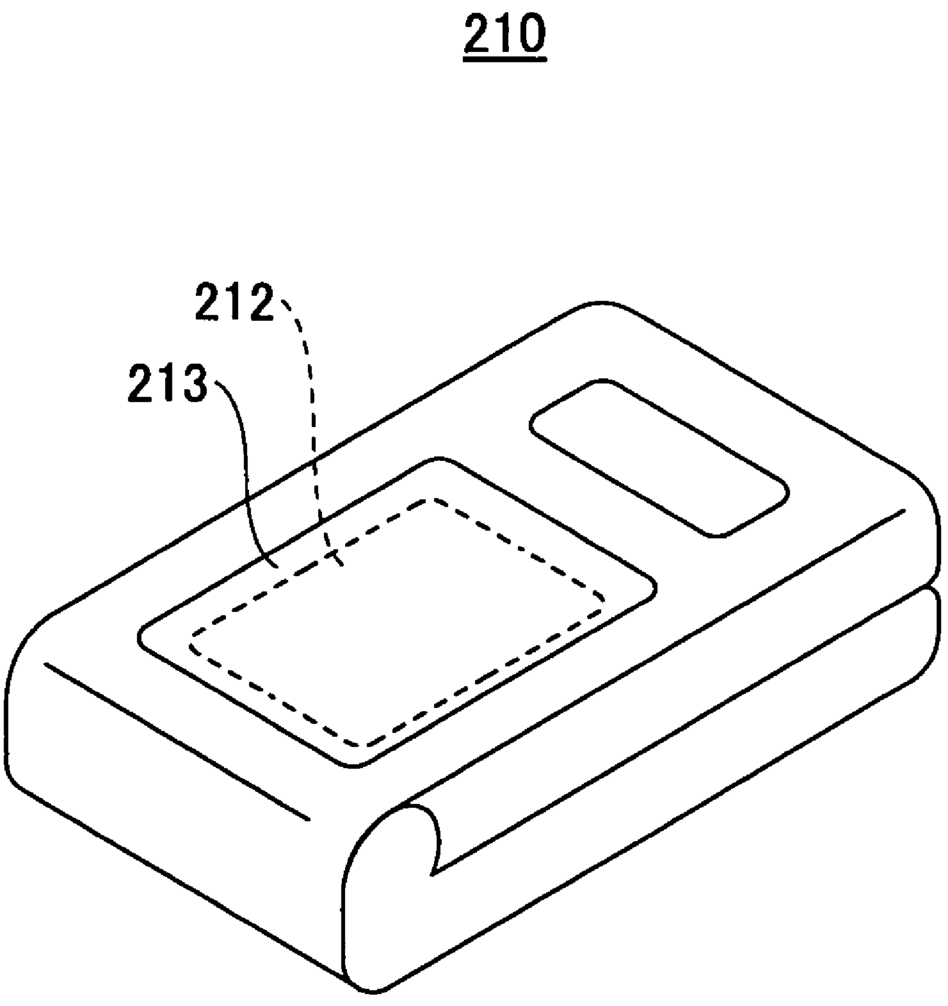
FIG. 23 illustrates a mobile phone to which an optical window member according to an embodiment of the present invention is applied.

As shown in FIG. 23, a mobile phone 210, which is one example of a device, has a built-in solar battery 212. An embodiment of the present invention can be applied as an optical window member 213 covering the solar battery 212.

The optical window member 20 can also be used in a light emitting object to cover a light emitting surface of, for example, an LED. In this case, the light emitted from the LED is visible, but the outline of the LED is not visible. The outline of the LED can be made invisible even when the LED is not emitting light.

The present invention is not limited to the specifically disclosed embodiment, and variations and modifications may be made without departing from the scope of the present invention.

The present application is based on Japanese Priority Patent Application No. 2007-039479, filed on Feb. 20, 2007, the entire contents of which are hereby incorporated by reference.

What is claimed is:

1. A solar-powered watch, comprising:

an optical window member, including— a transparent synthetic resin plate having a top surface with a pattern of a plurality of concentric and contacting protrusions/recesses that cause light diffusion, and a bottom surface opposite the top surface; and an optical thin film having a top surface and a bottom surface, the bottom surface being positioned at the top surface of the transparent synthetic resin plate, each of the top and bottom surfaces of the optical thin film having a protruding/recessed pattern corresponding to the pattern on the top surface of the plate, wherein the optical thin film is a top layer of the optical window member, and wherein each of the protruding/recessed patterns is regularly arranged at a predetermined same pitch; and a solar battery positioned near the bottom surface of the plate, wherein light irradiated in a direction perpendicular to the top surface of the optical thin film enters the optical thin film through the pattern on the top surface of the optical thin film, some of the entering light is reflected by the pattern on the top surface of the plate out of the pattern on the top surface of the optical thin film, a remainder of the light passes through the pattern on the top surface of the plate, some of which charges the solar battery and some of which is reflected by the battery and exits through the patterns and out the top surface of the optical thin film, and wherein the light diffusion substantially prevents seeing the battery through the optical window member.

2. The watch according to claim 1, wherein the respective top surfaces of the transparent synthetic resin plate and the optical thin film are divided into plural sections and sectional shapes of the protruding/recessed patterns are different in each of the sections.

3. The watch according to claim 2, wherein each of the protrusions has a sectional shape that is any one of a triangle, a trapezoid, a semicircle, and a trapezoid whose oblique sides are both staircase-like lines.

4. The watch according to claim 1, wherein:

the optical thin film comprises at least one thin film of a high refractive index and at least one thin film of a low refractive index that are laminated alternately.

* * * * *